(12) United States Patent
Chang et al.

(10) Patent No.: US 9,167,568 B2
(45) Date of Patent: ***Oct. 20, 2015

(54) METHOD AND APPARATUS FOR TRANSMITTING AND RECEIVING CONTROL INFORMATION IN A WIRELESS COMMUNICATION SYSTEM

(71) Applicant: Samsung Electronics Co., Ltd., Suwon-si, Gyeonggi-do (KR)

(72) Inventors: Young-Bin Chang, Anyang-si (KR); Jung-Je Son, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/177,733

(22) Filed: Feb. 11, 2014

(65) Prior Publication Data

US 2014/0192741 A1   Jul. 10, 2014

Related U.S. Application Data

(63) Continuation of application No. 13/094,169, filed on Apr. 26, 2011, now Pat. No. 8,717,988.

(30) Foreign Application Priority Data

Apr. 30, 2010   (KR) .................. 10-2010-0041120

(51) Int. Cl.
*H04W 28/18*       (2009.01)
*H04W 72/04*       (2009.01)
*H04W 56/00*       (2009.01)
*H04L 1/18*        (2006.01)

(Continued)

(52) U.S. Cl.
CPC ......... *H04W 72/0406* (2013.01); *H04L 1/1864* (2013.01); *H04L 1/1896* (2013.01); *H04W 72/00* (2013.01); *H04W 76/021* (2013.01)

(58) Field of Classification Search
CPC .............. H04L 1/1864; H04L 1/1896; H04W 72/0406; H04W 76/021
USPC .......... 370/252, 312, 328, 329, 350; 714/748; 455/450
See application file for complete search history.

(56) References Cited

U.S. PATENT DOCUMENTS 7,941,151 B2   5/2011   Rudolf et al.
8,483,136 B2   7/2013   Yuk et al.
(Continued)

FOREIGN PATENT DOCUMENTS

CN   101103600 A   1/2008
EP   1679932 A1   7/2006
(Continued)

OTHER PUBLICATIONS

Samsung Electronics, AAI_ARQ—Reset message modification (16.2.3.44), IEEE C802.16m-10/0682, Apr. 30, 2010, URL: www.ieee802.org/16/tgm/contrib/C80216m-10_0682.doc.

*Primary Examiner* — Ahmed Elallam
(74) *Attorney, Agent, or Firm* — Jefferson IP Law, LLP

(57) ABSTRACT

A method in a wireless communication system is provided. The method includes generating a message including an indicator indicating whether a connection to perform Automatic Repeat reQuest reset is a downlink connection or an uplink connection and transmitting the message.

20 Claims, 5 Drawing Sheets

(51) Int. Cl.
*H04W 76/02* (2009.01)
*H04W 72/00* (2009.01)

(56) References Cited

U.S. PATENT DOCUMENTS

| | | | |
|---|---|---|---|
| 8,494,570 B2 * | 7/2013 | Kim et al. ............... | 455/509 |
| 8,498,251 B2 | 7/2013 | Kim et al. | |
| 2005/0232181 A1 * | 10/2005 | Park et al. .............. | 370/319 |
| 2006/0153112 A1 | 7/2006 | Lim et al. | |
| 2007/0060167 A1 | 3/2007 | Damnjanovic et al. | |
| 2007/0153793 A1 | 7/2007 | Jiang | |
| 2007/0277072 A1 * | 11/2007 | Schaap et al. ........... | 714/748 |
| 2007/0286066 A1 | 12/2007 | Zhang et al. | |
| 2008/0130537 A1 | 6/2008 | Kim et al. | |
| 2008/0192622 A1 | 8/2008 | Scheim et al. | |
| 2009/0068944 A1 | 3/2009 | Kang et al. | |
| 2009/0168708 A1 | 7/2009 | Kumar et al. | |
| 2009/0228754 A1 * | 9/2009 | Roy et al. .............. | 714/749 |
| 2010/0005358 A1 | 1/2010 | Lim et al. | |
| 2010/0185910 A1 | 7/2010 | Lee et al. | |
| 2011/0007697 A1 | 1/2011 | Ryu et al. | |
| 2011/0099447 A1 | 4/2011 | Park et al. | |
| 2011/0188432 A1 * | 8/2011 | Yin ....................... | 370/311 |
| 2011/0211510 A1 | 9/2011 | Kim et al. | |
| 2012/0014287 A1 * | 1/2012 | Kim et al. .............. | 370/254 |

FOREIGN PATENT DOCUMENTS

| | | |
|---|---|---|
| JP | 2007-184938 A | 7/2007 |
| JP | 2007-228377 A | 9/2007 |

* cited by examiner

METHOD AND APPARATUS FOR TRANSMITTING AND RECEIVING CONTROL INFORMATION IN A WIRELESS COMMUNICATION SYSTEM

PRIORITY

This application is a continuation application of a prior application Ser. No. 13/094,169, filed on Apr. 26, 2011, which claimed the benefit under 35 U.S.C. §119(a) of a Korean patent application filed on Apr. 30, 2010 in the Korean Intellectual Property Office and assigned Serial number 10-2010-0041120, the entire disclosure of which is hereby incorporated by reference.

BACKGROUND OF THE INVENTION

1. Field of the Invention

The present invention relates to a wireless communication system. More particularly, the present invention relates to a method and apparatus for transmitting and receiving control information using an Identification (ID) that identifies a connection.

2. Description of the Related Art

To satisfy increasing demands for large-capacity data services such as various multimedia Internet services as well as voice services in the wireless communication market, active research has been conducted on new wireless transmission standards, such as Institute of Electrical and Electronics Engineers (IEEE) 802.16e Wireless Broadband (WiBro) or Mobile Worldwide interoperability for Microwave Access (WiMAX), Wireless Local Area Network (WLAN), and $3^{rd}$ Generation Partnership Project Long Term Evolution (3GPP LTE).

In a wireless communication system, data and control messages are exchanged through one or more connections or flows on an uplink directed from a Mobile Station (MS) to a Base Station (BS) and on a downlink directed from the BS to the MS. The uplink and downlink connections are identified by their independent IDs.

FIG. 1 illustrates Connection IDs (CIDs) used to identify connections in a Mobile WiMAX system according to the related art.

Referring to FIG. 1, a CID space 100 is divided into a DownLink (DL) CID space 102 and an UpLink (UL) CID space 104. Each of the DL and UL CID spaces 102 and 104 includes predetermined CIDs of 16 bits, for example. Once a DL connection is established, a DL CID is selected from the DL CID space 102 and allocated to the DL connection. Similarly, if a UL connection is established, a UL CID is selected from the UL CID space 104 and allocated to the UL connection. Accordingly, the DL and UL CIDs do not have the same value.

FIG. 2 illustrates flow IDs used to identify connections in an Advanced Mobile WiMAX system according to the related art.

Referring to FIG. 2, a DL or UL flow ID 202 is selected from a whole flow ID space 200. Although flow IDs function like CIDs illustrated in FIG. 1, UL and DL flow IDs may have the same value.

A transmitter and a receiver may support Automatic Repeat reQuest (ARQ) to correct transmission and reception errors in data. An ARQ operation may be performed independently within each connection between the transmitter and receiver. Since packets for each connection are transmitted with a unique CID, the receiver can identify an initial transmission packet and a retransmission packet of the same connection by the CID of the connection and then combine the packets.

The transmitter and receiver may perform an ARQ reset on the uplink or the downlink due to ARQ synchronization loss or other implementation factors. In this case, if one of the transmitter and the receiver performs an ARQ reset, the other party cannot determine whether the ARQ reset is for an uplink or downlink data connection using only a flow ID set in an ARQ reset control message. Similarly, when control information for a connection which should be identified as an uplink or downlink connection is to be transmitted, it is necessary to indicate the link type of the connection.

SUMMARY OF THE INVENTION

Aspects of the present invention are to address at least the above-mentioned problems and/or disadvantages and to provide at least the advantages described below. Accordingly, an aspect of the present invention is to provide a method and apparatus for transmitting and receiving control information using an Identification (ID) that identifies a connection in a wireless communication system.

Another aspect of the present invention is to provide a method and apparatus for transmitting and receiving control information for resetting an Automatic Repeat reQuest (ARQ) operation in a wireless communication system.

A further aspect of the present invention is to provide a method and apparatus for, when control information is transmitted, indicating whether a flow corresponding to the control information is for an uplink or a downlink in a wireless communication system.

In accordance with an aspect of the present invention, a method for transmitting control information in a wireless communication system is provided. The method includes generating a DownLink/UpLink (DL/UL) indicator indicating whether a connection associated with control information to be transmitted is a DL connection or a UL connection and a flow Identification (ID) that identifies the connection, and transmitting control information including the DL/UL indicator and the flow ID to another party to the connection.

In accordance with another aspect of the present invention, a method for receiving control information in a wireless communication system is provided. The method includes receiving control information, decoding from the control information a DL/UL indicator indicating whether a connection associated with the control information is a DL connection or a UL connection and a flow ID that identifies the connection, and determining whether the control information is associated with a DL connection or a UL connection based on the DL/UL indicator and the flow ID.

In accordance with another aspect of the present invention, an apparatus for transmitting control information in a wireless communication system is provided. The apparatus includes a controller for generating a DL/UL indicator indicating whether a connection associated with control information to be transmitted is a DL connection or a UL connection and a flow ID that identifies the connection, and a transmitter for transmitting control information including the DL/UL indicator and the flow ID to another party to the connection.

In accordance with a further aspect of the present invention, an apparatus for receiving control information in a wireless communication system is provided. The apparatus includes a receiver for receiving control information, and a processor for decoding from the control information a DL/UL indicator indicating whether a connection associated with the control information is a DL connection or a UL connection and a flow ID that identifies the connection, and determines whether the control information is associated with a DL connection or a UL connection based on the DL/UL indicator and the flow ID.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

While control information transmission and reception operations are described herein in the context of an Institute of Electrical and Electronics Engineers (IEEE) 802.16e/m system as a wireless cellular communication system, it is clearly understood to those skilled in the art that the control information transmission and reception operations of the present invention are not limited to a particular communication protocol or system configuration and that many modifications can be made within the scope and spirit of the present invention.

Figure 1:
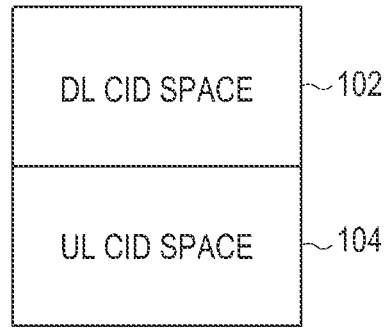
FIG. 1 illustrates Connection Identifications (CIDs) used to identify connections in a Mobile Worldwide interoperability for Microwave Access (WiMAX) system according to the related art.
Figure 2:
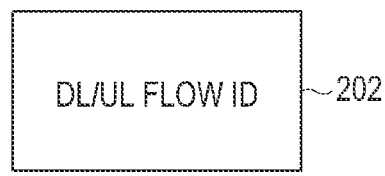
FIG. 2 illustrates flow IDs used to identify connections in an Advanced Mobile WiMAX system according to the related art.
Figure 3:
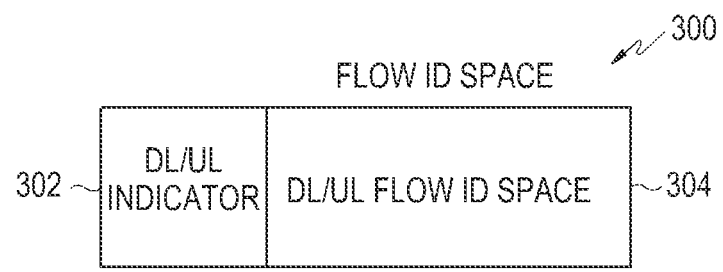
FIG. 3 illustrates uplink and downlink IDs according to an exemplary embodiment of the present invention.

FIG. 3 illustrates UpLink (UL) and DownLink (DL) Identifications (IDs) according to an exemplary embodiment of the present invention.

Referring to FIG. 3, a flow ID space 300 includes a DL/UL indicator 302 and a DL/UL flow ID space 304. A flow ID for a connection is selected from the DL/UL flow ID space 304 and allocated to the connection. For a data and control connection that needs DL or UL identification, the DL/UL indicator 302 is used. The DL/UL indicator 302 may be included in control information to indicate whether the flow ID is for the downlink or the uplink.

Figure 4:
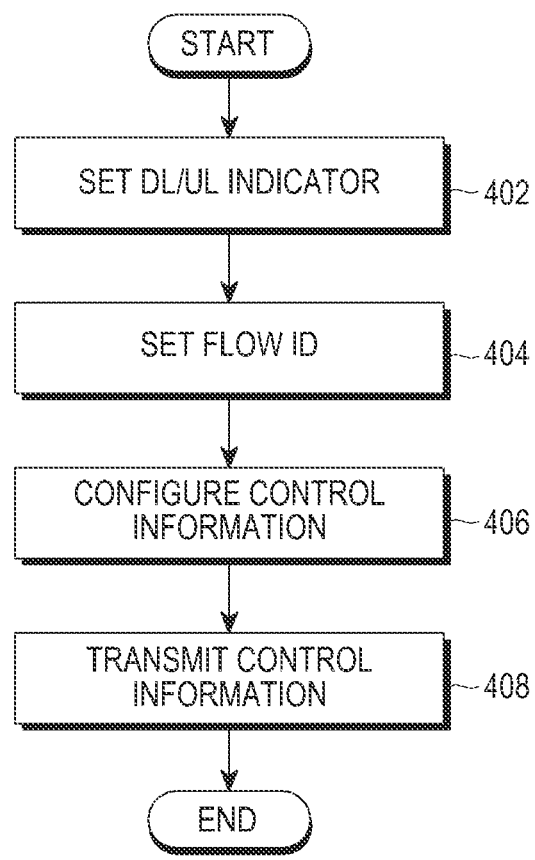
FIG. 4 is a flowchart illustrating an operation for transmitting control information at a transmitter according to an exemplary embodiment of the present invention.

FIG. 4 is a flowchart illustrating an operation for transmitting control information at a transmitter according to an exemplary embodiment of the present invention. The transmitter may be a Mobile Station (MS) on an uplink or a Base Station (BS) on a downlink.

Referring to FIG. 4, when determining to transmit control information requiring identification of a downlink or uplink connection, the transmitter sets a DL/UL indicator indicating a downlink or uplink connection in the control information in step 402. For example, the control information requiring identification of a downlink or uplink connection may be at least one message for controlling an Automatic Repeat reQuest (ARQ) reset, such as an ARQ reset initiation message, an ARQ reset ACKnowledgment (ACK) message, and an ARQ reset confirm message.

The transmitter sets a flow ID in the control information to identify a connection associated with the control information in step 404 and completes configuring the control information in step 406. Configuring the control information involves inserting other specific information together with the DL/UL indicator and the flow ID into the control information and formatting the control information in a predetermined format. The DL/UL indicator may be 1 bit. In step 408, the transmitter transmits the control information to a receiver. The control information may be transmitted in the form of a control message or a control header.

Figure 5:
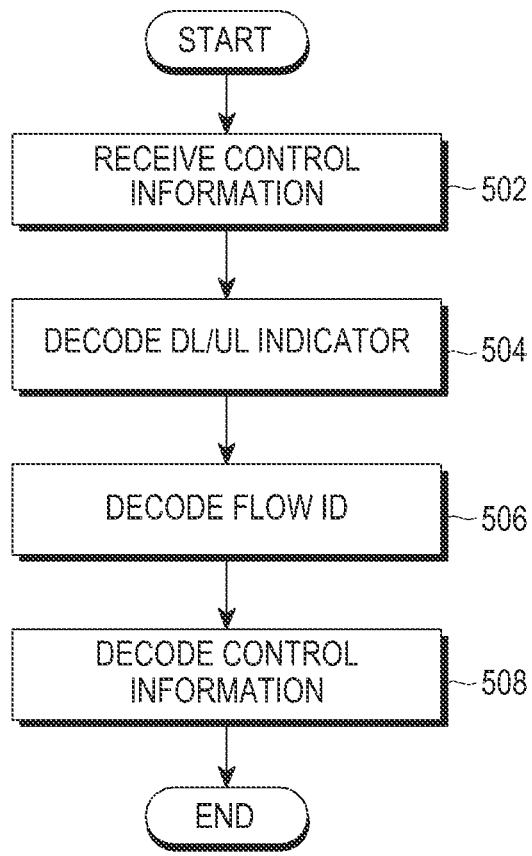
FIG. 5 is a flowchart illustrating an operation for receiving control information at a receiver according to an exemplary embodiment of the present invention.

FIG. 5 is a flowchart illustrating an operation for receiving control information at a receiver according to an exemplary embodiment of the present invention. The receiver may be a BS on an uplink or an MS on a downlink.

Referring to FIG. 5, the receiver receives control information in a control message or a control header from a transmitter in step 502, extracts a DL/UL indicator from the control information, and decodes the DL/UL indicator in step 504. In step 506, the receiver extracts a flow ID from the control information, decodes the flow ID, and determines whether the control information is associated with an uplink or downlink connection. The receiver decodes other specific information included in the control information and performs an operation corresponding to the decoded information in step 508. For example, if the control information is an ARQ reset control message, the receiver resets an ARQ operation for the uplink or downlink connection indicated by the DL/UL indicator and the flow ID.

As described above, when a control message including a flow ID for an uplink data connection and a control message including a flow ID for a downlink data connection are generated simultaneously in the wireless communication system, DL/UL indicators set in the control messages indicate whether the connections are for an uplink or a downlink.

A description of exemplary embodiments of the present invention for initiating an ARQ reset operation using a control message including a DL/UL indicator and a flow ID is provided below. However, exemplary embodiments of the present invention are not limited to this specific message and operation and it is to be clearly understood that the present invention is applicable to transmission of any control information and message requiring identification of an uplink or downlink connection.

Figure 6:
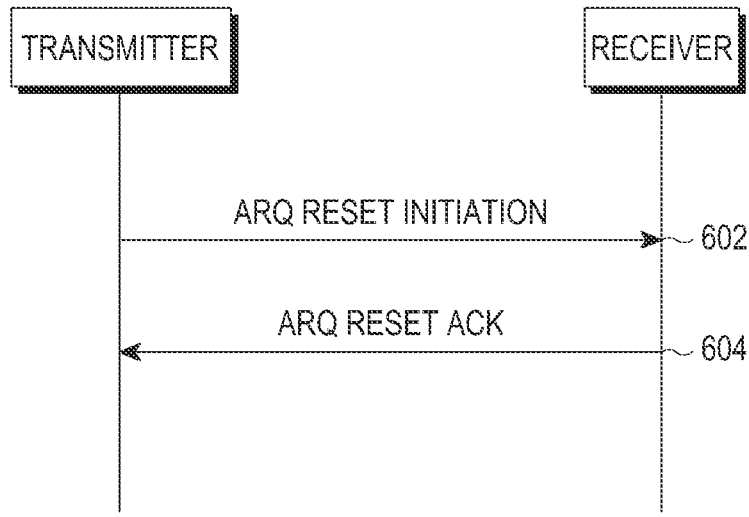
FIG. 6 is a diagram illustrating a message flow for an operation for initiating an Automatic Repeat Request (ARQ) reset at the transmitter according to an exemplary embodiment of the present invention.

FIG. 6 is a diagram illustrating a message flow for an operation for initiating an ARQ reset at the transmitter according to an exemplary embodiment of the present invention.

Referring to FIG. 6, the transmitter sets a DL/UL indicator, a flow ID, and other information related to an ARQ reset in an ARQ reset initiation message and transmits the ARQ reset initiation message to the receiver in order to initiate an ARQ reset in step 602. The DL/UL indicator indicates whether the ARQ reset initiation message is associated with an uplink or downlink data connection.

In step 604, the receiver transmits an ARQ reset ACK message to the transmitter in response to the ARQ reset initiation message. Like the ARQ reset initiation message, the ARQ reset ACK message includes a DL/UL indicator and a flow ID to indicate whether the ARQ reset ACK message is associated with an uplink or downlink data connection. The ARQ reset ACK message includes the same DL/UL indicator and flow ID as those set in the ARQ reset initiation message.

While not shown, the receiver resets an ARQ operation for a data connection indicated by the flow ID among active data connections on a link indicated by the DL/UL indicator. The ARQ operation reset may include initializing a sequence number for the ARQ operation and clearing an ARQ buffer. Similarly, after transmitting the ARQ reset initiation message or receiving the ARQ reset ACK message, the transmitter resets the ARQ operation for the data connection indicated by the DL/UL indicator and the flow ID. Accordingly, the transmitter and the receiver may reset the ARQ operation for the same data connection.

Figure 7:
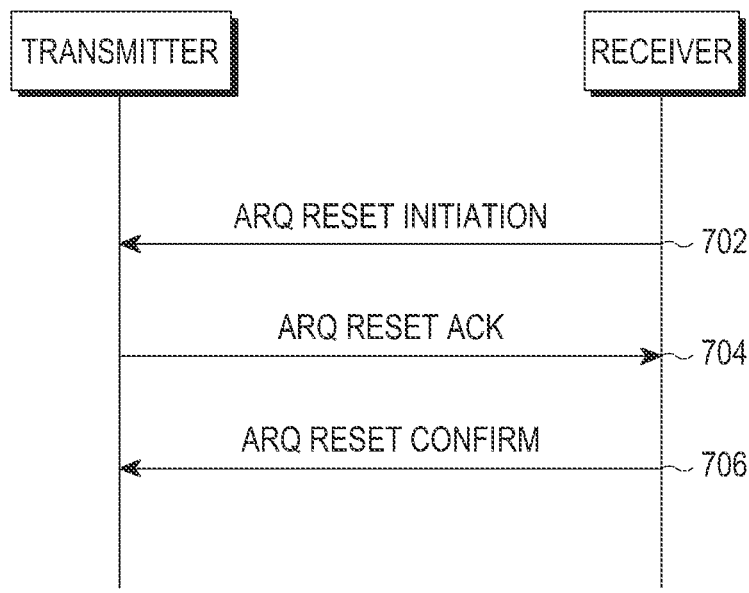
FIG. 7 is a diagram illustrating a message flow for an operation for initiating an ARQ reset at the receiver according to an exemplary embodiment of the present invention.

FIG. 7 is a diagram illustrating a message flow for an operation for initiating an ARQ reset at the receiver according to an exemplary embodiment of the present invention.

Referring to FIG. 7, the receiver sets a DL/UL indicator, a flow ID, and other information related to an ARQ reset in an ARQ reset initiation message and transmits the ARQ reset initiation message to the transmitter in order to initiate the ARQ reset in step 702. The DL/UL indicator indicates whether the ARQ reset initiation message is associated with an uplink or downlink data connection.

In step 704, the transmitter transmits an ARQ reset ACK message to the receiver in response to the ARQ reset initiation message. Like the ARQ reset initiation message, the ARQ reset ACK message includes a DL/UL indicator and a flow ID to indicate whether the ARQ reset ACK message is associated with an uplink or downlink data connection. The ARQ reset ACK message includes the same DL/UL indicator and flow ID as those set in the ARQ reset initiation message received from the receiver.

In step 706, the receiver transmits an ARQ reset confirm message to the transmitter in response to the ARQ reset ACK message. The ARQ reset confirm message includes the same DL/UL indicator and flow ID as those set in the ARQ reset ACK message.

While not shown, after receiving the ARQ reset initiation message or the ARQ reset confirm message or after transmitting the ARQ reset ACK message, the transmitter resets an ARQ operation for a data connection indicated by the flow ID among active data connections on a link indicated by the DL/UL indicator. The ARQ operation reset may include initializing a sequence number for the ARQ operation and clearing an ARQ buffer. Similarly, after transmitting the ARQ reset initiation message or the ARQ reset confirm message or after receiving the ARQ reset ACK message, the receiver resets the ARQ operation for the data connection indicated by the DL/UL indicator and the flow ID. Accordingly, the transmitter and the receiver may reset the ARQ operation for the same data connection.

The ARQ reset control messages, such as the ARQ reset initiation message, the ARQ reset ACK message, and the ARQ reset confirm message may have the following configuration.

TABLE 1

| Syntax | Size | Note |
| --- | --- | --- |
| ARQ_Reset_Message_Format { | | |
| Message type | 8 | |
| DL/UL indicator | 1 | 0b00 = Downlink |
| | | 0b01 = Uplink |
| Flow ID | 4 | Corresponding connection ID to perform ARQ reset procedure. |
| Type | 2 | 0b00 = Original message from Initiator |
| | | 0b01 = Acknowledgement from Responder |
| | | 0b10 = Confirmation from Initiator |
| | | 0b11 = Reserved |
| Reserved | 1 | Set to zero |
| } | | |

Figure 8:
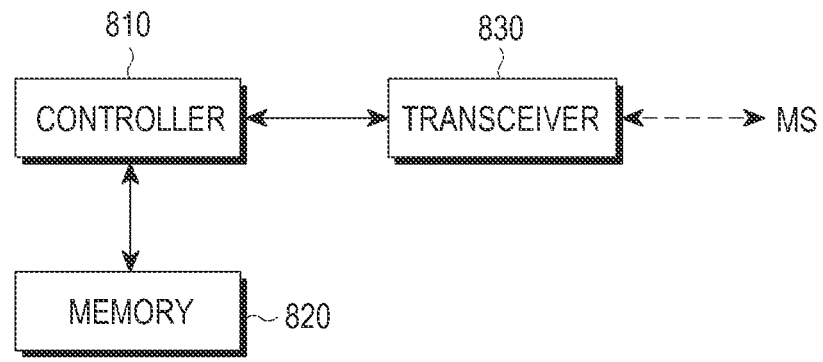
FIG. 8 is a block diagram of a Base Station (BS) according to an exemplary embodiment of the present invention.

FIG. 8 is a block diagram of a BS according to an exemplary embodiment of the present invention.

Referring to FIG. 8, the BS includes a controller 810, a memory 820, and a transceiver 830. The BS may operate as a transmitter for a downlink data connection and as a receiver for an uplink data connection. The controller 810 generates control information or a control message to be transmitted to an MS, transmits the control information or control message to the MS through the transceiver 830, interprets control information or a control message received through the transceiver 830, and performs an operation corresponding to the interpreted control information or control message according to at least one of the afore-described embodiments of the present invention. The memory 820 stores and manages program code and parameters required for operations of the controller 810, for example, the DL/UL indicator and flow ID of each connection, and provides a stored DL/UL indicator and a flow ID upon request of the controller 810. The transceiver 830 exchanges messages with the MS using a transmission scheme and a channel preset between the BS and the MS.

Figure 9:
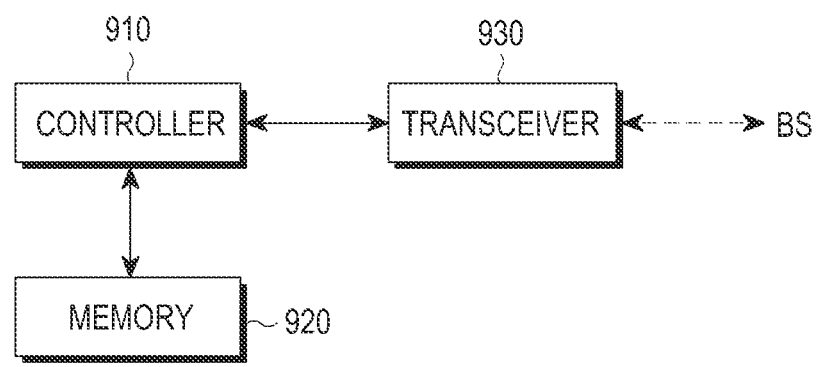
FIG. 9 is a block diagram of a Mobile Station (MS) according to an exemplary embodiment of the present invention.

FIG. 9 is a block diagram of an MS according to an exemplary embodiment of the present invention.

Referring to FIG. 9, the MS includes a controller 910, a memory 920, and a transceiver 930. The MS may operate as a receiver for a downlink data connection and as a transmitter for an uplink data connection. The transceiver 930 receives control information or a control message from a BS and provides the received control information or control message to the controller 910. The transceiver 930 also transmits control information or a control message generated from the controller 910 to the BS. The controller 910 generates control information or a control message, provides the control information or control message to the transceiver 930, interprets control information or a control message received through the transceiver 930, and performs an operation corresponding to the interpreted control information or control message. The memory 920 stores and manages program code and parameters required for operations of the controller 910, for example, the DL/UL indicator and flow ID of each connection, and provides a stored DL/UL indicator and a flow ID upon request of the controller 910.

As is apparent from the above description of the present invention, a DL/UL indicator is inserted into control information to be transmitted to indicate whether the control information is for a downlink or uplink connection. Since a connection for which an operation associated with the control information is to be performed is accurately indicated, a malfunction is prevented and the efficiency and accuracy of signaling are increased.

While the invention has been shown and described with reference to certain exemplary embodiments thereof, it will be understood by those skilled in the art that various changes in form and details may be made without departing from the spirit or scope of the invention as described by the appended claims and their equivalents.

What is claimed is:

1. A method in a wireless communication system, the method comprising:
   generating a message including an indicator indicating whether a connection to perform Automatic Repeat reQuest reset is a downlink connection or an uplink connection; and
   transmitting the message,
   wherein the message includes a flow identifier identifying the connection.

2. The method of claim 1, wherein the message is used to initiate the Automatic Repeat reQuest reset.

3. The method of claim 1, wherein the message includes fields for at least one of the indicator, a Type, and a reserved bit.

4. The method of claim 3, wherein the Automatic Repeat reQuest reset comprises:
   transmitting an original message from an initiator;
   receiving an Acknowledgement from a responder; and
   transmitting a confirmation from the initiator.

5. The method of claim 4, wherein a field for the Type is represented as bit information, if the bit information is '0b00', the message represents the original message, if the bit information is '0b01', the message represents the Acknowledgement, if the bit information is '0b10', the message represents the confirmation, and if the bit information is '0b11', the message represents the reserved bit.

6. A method in a wireless communication system, the method comprising:
   receiving a message including an indicator indicating whether a connection to perform Automatic Repeat reQuest reset is a downlink connection or an uplink connection,
   wherein the message includes a flow identifier identifying the connection.

7. The method of claim 6, wherein the message is used to initiate the Automatic Repeat reQuest.

8. The method of claim 6, wherein the message includes fields for at least one of the indicator, a Type, and a reserved bit.

9. The method of claim 8, wherein the Automatic Repeat reQuest reset comprises:
   receiving an original message from an initiator;
   transmitting an Acknowledgement from a responder; and
   receiving a confirmation from the initiator.

10. The method of claim 9, wherein a field for the Type is represented as bit information, if the bit information is '0b00', the message represents the original message, if the bit information is '0b01', the message represents the Acknowledgement, if the bit information is '0b10', the message represents the confirmation, and if the bit information is '0b11', the message represents the reserved bit.

11. An apparatus for transmitting in a wireless communication system, the apparatus comprising:
    a controller for generating a message including an indicator indicating whether a connection to perform Automatic Repeat reQuest reset is a downlink connection or an uplink connection, and controlling a transceiver for transmitting the message,
    wherein the message includes a flow identifier identifying the connection.

12. The apparatus of claim 11, wherein the message is used to initiate the Automatic Repeat reQuest reset.

13. The apparatus of claim 11, wherein the message includes fields for at least one of the indicator, a Type, and a reserved bit.

14. The apparatus of claim 13, wherein the Automatic Repeat reQuest reset comprises:
    transmitting an original message from an initiator;
    receiving an Acknowledgement from a responder; and
    transmitting a confirmation from the initiator.

15. The apparatus of claim 14, wherein a field for the Type is represented as bit information, if the bit information is '0b00', the message represents the original message, if the bit information is '0b01', the message represents the Acknowledgement, if the bit information is '0b10', the message represents the confirmation, and if the bit information is '0b11', the message represents the reserved bit.

16. An apparatus for receiving in a wireless communication system, the apparatus comprising:
    a transceiver for receiving a message including an indicator indicating whether a connection to perform Automatic Repeat reQuest reset is a downlink connection or an uplink connection,
    wherein the message includes a flow identifier identifying the connection.

17. The apparatus of claim 16, wherein the message is used to initiate the Automatic Repeat reQuest.

18. The apparatus of claim 16, wherein the message includes fields for at least one of the indicator, a Type, and a reserved bit.

19. The apparatus of claim 18, wherein the Automatic Repeat reQuest comprises:
    the transceiver receives an original message from an initiator, transmits an Acknowledgement from a responder, and receives a confirmation from the initiator.

20. The apparatus of claim 19, wherein a field for the Type is represented as bit information, if the bit information is '0b00', the message represents the original message, if the bit information is '0b01', the message represents the Acknowledgement, if the bit information is '0b10', the message represents the confirmation, and if the bit information is '0b11', the message represents the reserved bit.

* * * * *